US005814685A

United States Patent [19]

Satake et al.

[11] Patent Number: 5,814,685

[45] Date of Patent: Sep. 29, 1998

[54] INK JET RECORDING LIQUID

[75] Inventors: Sunao Satake; Seiji Sawada; Yasuharu Iida; Tsutomu Fujigamori, all of Tokyo, Japan

[73] Assignee: Toyo Ink Manufacturing Co., Ltd., Tokyo, Japan

[21] Appl. No.: 819,447

[22] Filed: Mar. 17, 1997

[30] Foreign Application Priority Data

Mar. 18, 1996 [JP] Japan .................................... 8-060492

[51] Int. Cl.$^{6}$ ............................ C09D 11/10; C08L 33/06; C08L 25/04

[52] U.S. Cl. .......................... 523/201; 523/160; 524/386; 525/902

[58] Field of Search .................................... 523/160, 161, 523/201; 524/386; 525/902

[56] References Cited

U.S. PATENT DOCUMENTS 5,185,387 2/1993 Klesse et al. ........................... 523/201
5,308,890 5/1994 Snyder .................................... 523/201

FOREIGN PATENT DOCUMENTS 156871 6/1988 Japan ..................................... 523/201

*Primary Examiner*—Peter A. Szekely
*Attorney, Agent, or Firm*—Oblon, Spivak, McClelland, Maier & Neustadt, P.C.

[57] ABSTRACT

The present invention relates to an aqueous ink jet recording liquid of a pigment type, which liquid has excellent stability and printing characteristics; and also to a process for the preparation of said liquid. The ink jet recording liquid of the present invention is obtained by dispersing a pigment and a resin in an aqueous medium. Said resin is an aqueous dispersion-type resin comprising a shell composed of a polymer having a glass transition point in the range of 50° C. to 150° C. and a core composed of a polymer having a glass transition point in the range of −100° C. to 40° C.

10 Claims, No Drawings

INK JET RECORDING LIQUID

BACKGROUND OF THE INVENTION

1. Field of the Invention

The present invention relates to an ink jet recording liquid. More specifically, this invention relates to an aqueous ink jet recording liquid containing pigment, having excellent dispersion stability and printing characteristics; and also the process for preparing the liquid.

2. Description of the Prior Art

Various aqueous ink jet recording liquids have been in use which are prepared by dissolving water-soluble dyes in aqueous media and adding variety of additives as needed to the resulting solutions. Particularly important properties required for such an aqueous ink jet recording liquid are as follows:

(1) ability to produce high-quality recording images free from bleeding, (2) rapid drying and fixing rate of the recording liquid, (3) the recording liquid can be discharged stably without causing clogging of the recording liquid at a nozzle and liquid flow passages, (4) a superior storage stability of the recording liquid, (5) a high recording density, and (6) a superior weather- and water-resistance of the printed matter.

To impart stability to a recording liquid, acid dyes, direct dyes or basic dyes have been customarily used for the ink jet recording liquid as disclosed in Japanese Patent Application Laid-Open No. S53-61412, S54-89811, S55-65269 or the like. Those dyes, however, are accompanied by the problem of poor water resistance because of their high water-solubility. Moreover, weather resistance of dyes is generally poor.

In order to improve such poor water resistance, there have been attempts to structurally alter a dye and/or prepare a strongly basic recording liquid as disclosed in Japanese Patent Application Laid-Open No. S56-57862.

There have also been attempts to improve the water resistance by making use of the reaction between the recording paper and the recording liquid as disclosed in Japanese Patent Application Laid-Open No. S50-49004, S57-36692, S59-20696, and S59-146889.

The above-described attempts have produced desired results in certain types of recording paper. The recording liquid using a water-soluble dye, however, does not impart sufficient water resistance to the recorded material because of a large variety of recording paper used in ink jet printing. In addition, it is accompanied by bleeding of recorded images and slow drying rate of the recording liquid.

To reduce or eliminate bleeding and improve water resistance, there have been attempts to add emulsion polymers to the recording liquid. For example, disclosed in Japanese Patent Application Laid-Open No. S54-58504 and S54-146109 are recording liquids using oil base dye impregnated with an emulsion polymer, which dye has been obtained by immersing the oil base dye in the emulsion polymer to cause swelling. Japanese Patent Application Laid-Open No. S55-18412 discloses a recording liquid containing an emulsion polymer. Japanese Patent Application Laid-Open No. S62-184072 discloses a recording liquid obtained by reacting an emulsion of a crosslinked polymer with a dye. Japanese Patent Application Laid-Open No. H3-6270 discloses a recording liquid containing an emulsion of a crosslinked polymer. Japanese Patent Application Laid-Open No. H3-160068 discloses a recording liquid containing an emulsion having the minimum film-forming temperature (MFT) of 40° C. or higher. Japanese Patent Application Laid-Open No. H3-250069 discloses a recording liquid using an emulsion stained with a dye.

The recording liquids described in the above disclosures do not exhibit sufficient water resistance and light fastness because they are essentially recording liquids using a dye. Moreover, the emulsion polymer tends to cause clogging in the liquid passage of an ink jet printer, particularly at the nozzle. As a consequence, there has been a demand for a binder resin suited for ink jet printing; i.e. resin which permits the stable discharge of recording liquid to a target surface without causing clogging.

As a coloring material, pigment possesses excellent water resistance and light fastness. Thus recording liquids containing pigments have been regarded promising. Various types of such liquids have been under investigation. However, since a pigment by itself does not adhere firmly to recording paper or OHP sheet, a binder resin is required in combination. Furthermore, since pigments are insoluble in water, it is difficult to disperse pigment particles stably in an aqueous medium. To overcome these difficulties including those related to the pigment itself, it is necessary to use a binder resin which eliminates clogging of the resulting recording liquid upon discharge and offers improved dispersion stability of the pigment, good water resistance, light fastness, and high resolution of the recorded image.

SUMMARY OF THE INVENTION

An object of the present invention is to provide an aqueous pigment-type ink jet recording liquid with the requisite characteristics for ink jet printing, in particular, excellent water resistance and light fastness, high resolution of the recorded image and good dispersion stability. Another object of the present invention is to provide an aqueous pigment-type ink jet recording liquid which does not cause clogging in the liquid passage of an ink jet printer, particularly at the nozzle, thereby permitting the stable discharge of the liquid to the printing surface.

The ink jet recording liquid of the present invention produces a recorded image having good water resistance, light fastness and high resolution. Although the ink jet recording liquid of the present invention is aqueous, it has excellent water resistance. Thus it can be used effectively in an office for document preparation, addressing envelopes, marking corrugated cardboards, numbering, printing bar codes and other tasks. The recording liquid of the present invention is superior in light fastness to the prior art dye-type recording liquids. This property enables the production of recorded materials superior in storage stability.

The recording liquid of the present invention can be discharged to the recording surface without causing clogging in the liquid passage of an ink jet printer. Moreover, since it has good dispersion stability, stable operation of the ink jet printer can be maintained for a long period of time.

The ink jet recording liquid of the present invention is an ink jet recording liquid obtained by dispersing pigment and resin in an aqueous medium. The resin employed is an aqueous dispersion-type resin comprising a shell composed of a polymer having a glass transition point of 50° C. to 150° C. and a core having a glass transition point of −100° C. to 40° C.

A process for preparing an ink jet recording liquid of the present invention comprises: a process for preparing an aqueous dispersion-type resin by polymerizing a polymerizable monomer yielding a polymer having a glass transition point of −100° C. to 40° C., in an aqueous medium in the presence of a resin-type emulsifying agent composed of a polymer having a glass transition point of 50° C. to 150° C.; and a process for dispersing said aqueous dispersion-type resin with a pigment in said aqueous medium.

In the ink jet recording liquid of the present invention, the aqueous dispersion-type resin consists of a polymer shell with a high glass transition point and a polymer core with a low glass transition point. This resin is used as a binder which encases pigment particles. The recording liquid, therefore, has good storage stability and can be discharged stably to the recording surface without causing clogging.

Since the strongly hydrophobic core component has a low glass transition point, it can be formed easily into a film. It is assumed that upon the application of the recording liquid onto a recording surface, the core squeezes aside the hydrophilic shell and forms a film containing a uniform mixture of shell and core. Due to the higher glass transition point of the shell, the film thus formed is tough and highly water resistant. This makes it possible to provide printed matter with good water resistance.

DESCRIPTION OF THE PREFERRED EMBODIMENT

The resin contained in the ink jet recording liquid of the present invention is an aqueous dispersion-type resin consisting of a polymer shell having a glass transition point of 50° C. to 150° C. and a polymer core having a glass transition point of −100° C. to 40° C.

The aqueous dispersion-type resin can most conveniently be obtained by emulsifying and suspending a polymerizable monomer, which, when polymerized, results in a polymer having a glass transition point of −100° C. to 40° C., and additives such as a surfactant in an aqueous medium in the presence of a resin-type emulsifying agent composed of a polymer having a glass transition point of 50° C. to 150° C.; and then adding a water-soluble polymerization initiator to the resulting suspension to cause thermal polymerization.

Various particle shapes and particle sizes of the aqueous dispersion-type resin can be obtained by controlling the polymerization process and the choice of emulsifier. Particles having a particle size of several ten to several thousand nm are usually obtained.

Preferably the average particle size of the aqueous dispersion-type resin is 20–200 nm to prevent the resulting ink jet recording liquid from clogging the nozzle. More preferably, the particle size is in the range of 20–150 nm. The use of coarse particles tend to cause clogging at the printer nozzle. It is thus preferable to limit the fraction of the coarse particles of size larger than 1000 nm to less than 10 wt. % of the aqueous dispersion-type resin.

The resin-type emulsifying agent which forms the shell of the aqueous dispersion-type resin is a polymer having a glass transition point of 50° C. to 150° C., preferably 60° C. to 120° C. When the polymer has a glass transition point lower than 50° C., the resulting recording liquid produces printed matter of poor water resistance and sometimes creates clogging during discharge of the recording liquid. When the polymer has a glass transition point exceeding 150° C., on the other hand, the dispersibility of the aqueous dispersion-type resin in the aqueous medium deteriorates and leads to undesirable increase in the viscosity of the whole system. Glass transition points outside the above range are therefore not preferred.

The glass transition point (hereinafter abbreviated as "Tg") is determined using an analytical methods such as viscoelasticity measurement or thermal analysis. Alternatively it is calculated by an equation using known values of Tg of the homopolymers of the polymerizable monomer.

The Tg (absolute temperature) of the copolymer when it is composed of two polymerizable monomers (monomer A and monomer B) can be calculated by the equation:

100/(Tg of the copolymer)=(wt. % of A/Tg of the homopolymer of A)+(wt. % of B/Tg of the homopolymer of B).

Tg (absolute temperature) of a copolymer when the copolymer is composed of three polymerizable monomers (monomer A, monomer B and monomer C) is calculated by the equation:

100/(Tg of the copolymer)=(wt. % of A/Tg of the homopolymer of A)+(wt. % of B/Tg of the homopolymer of B)+(wt. % of C/Tg of the homopolymer of C).

Tg of a copolymer composed of four or more monomers can be calculated in a similar manner.

The resin-type emulsifying agent is prepared, for example, as follows: A hydrophilic polymerizable monomer or a mixture of at least two hydrophilic polymerizable monomers is copolymerized with another polymerizable monomer or a mixture of two or more such monomers so that the resulting polymer has a composition corresponding to Tg of 50° C. to 150° C. When an anionic-group-containing polymerizable monomer has to be used, it must be followed by neutralization with a base such as an alkali metal hydroxide or amine. When an amino-containing polymerizable monomer is used, on the other hand, it must be followed by neutralization with an acid such as acetic acid or hydrochloric acid. In this manner, one can prepare resin-type emulsifying agent required for this process.

Examples of the polymerizable monomer will be given together with Tg of the homopolymer of the polymerizable monomer in the following:

Examples of the hydrophilic polymerizable monomer include carboxyl-containing polymerizable monomers such as acrylic acid (106° C.), methacrylic acid (130° C.), itaconic acid (150° C.), fumaric acid or maleic acid; sulfonic-acid-containing polymerizable monomers such as 3-sulfopropyl acrylate; amino-containing polymerizable monomers such as N,N-dimethylaminoethyl methacrylate (20° C.) or N,N-diethylaminoethyl methacrylate; and amide group polymerizable monomers such as acrylamide (153° C.), vinyl acetamide or vinylpyrrolidone.

Examples of another monomer include alkyl acrylates such as methyl acrylate (8° C.), ethyl acrylate (−22° C.), isopropyl acrylate, butyl acrylate (−53° C.), 2-ethylhexyl acrylate (−85° C.), lauryl acrylate or stearyl acrylate; alkyl methacrylates such as methyl methacrylate (105° C.), ethyl methacrylate (65° C.), isopropyl methacrylate, butyl methacrylate (20° C.), 2-ethylhexyl methacrylate, lauryl methacrylate (−65° C.) or stearyl methacrylate; and reactive polymerizable monomers such as glycidyl acrylate, glycidyl methacrylate (41° C.) or acrolein.

Among the polymerizable monomers listed above, carboxyl-containing monomers such as acrylic acid or methacrylic acid are particularly preferred considering the water resistance of the printed matter using the resulting recording liquid and also the cost aspect of the recording liquid. Moreover, it is preferred that the acid value of the resin-type emulsifier using such monomer is 50 mgKOH/g–250 mgKOH/g, more preferably 100 mgKOH/g to 200 mgKOH/g. When the acid value is lower than the above range, the stability of the aqueous dispersion-type resin is reduced. When the acid value exceeds above range, on the other hand, the water resistance of the printed matter decreases. And further, it is preferred that the number average molecular weight of the resin-type emulsifier using such monomer is 3000–20000, more preferably 5000–15000.

The core of the aqueous dispersion-type resin is formed by a polymer having a glass transition point of −100° C. to 40° C., preferably −50° C. to 20° C. The glass transition points of the polymer lower than −100° C. render the resulting printed matter sticky. It also hinders the stable discharge (which will hereinafter be called "discharge stability") of recording liquid onto the recording surface. When the glass transition point of the polymer exceeds 40° C., on the other hand, a strongly hydrophobic polymer of the core fails to form a film during printing, resulting in poor water resistance of the printed matter.

No particular limitation is imposed on the polymerizable monomer for the synthesis of a polymer which forms the core of the aqueous dispersion-type resin insofar as it is a compound having one or more ethylenic unsaturated double bonds. A polymerizable monomer or a mixture of at least two such monomers can be added in such proportion that the resulting polymer has a Tg of −100° C. to 40° C. For the synthesis of the core-forming polymer, those used for the resin-type emulsifying agent for the shell such as alkyl (meth)acrylates, carboxyl-containing polymerizable monomers, sulfonic-acid-containing polymerizable monomers and reactive polymerizable monomers can also be employed.

Other examples of the polymerizable monomers for the formation of the core include hydroxyl-containing polymerizable monomers such as hydroxyethyl acrylate (−15° C.), hydroxyethyl methacrylate, hydroxypropyl acrylate and hydroxypropyl methacrylate; and amide base polymerizable monomers such as acrylamide (153° C.), methacrylamide, N-methylol acrylamide, N-methylol methacrylamide, di-N-methylol acrylamide, di-N-methylol methacrylamide, vinyl acetamide and vinylpyrrolidone.

Examples also include polyfunctional polymerizable monomers such as ethylene glycol diacrylate, ethylene glycol dimethacrylate, butanediol diacrylate, butanediol dimethacrylate, 1,6-hexanediol diacrylate, 1,6-hexanediol dimethacrylate, polyethylene glycol diacrylate, polyethylene glycol dimethacrylate, trimethylol propane triacrylate, trimethylol propane trimethacrylate, pentaerythritol triacrylate and pentaerythritol trimethacrylate.

In addition, cationic-group-containing polymerizable monomers such as N,N-dimethylaminoethyl acrylate, N,N-dimethylaminoethyl methacrylate (20° C.), N,N-diethylaminoethyl acrylate, N, N-diethylaminoethyl methacrylate and vinyl pyridine, styrene (100° C.), methylstyrene, vinyltoluene, vinyl acetate, acrylonitrile and butadiene can be given as examples.

It is desirable that the weight ratio of the shell to the core of the aqueous dispersion-type resin falls within a range of 10:90 to 70:30. When the weight ratio of the shell is smaller than the above range, it becomes impossible to produce a stable aqueous dispersion-type resin. When the weight ratio of the shell exceeds the above range, the resulting printed matter is likely to exhibit poor water resistance.

It is also desirable that the aqueous dispersion-type resin constitutes in a solid form 0.1–10 wt. % of the recording liquid, more preferably 0.5 to 5 wt. %. When the content of the aqueous dispersion-type resin is less than 0.1 wt. %, poor water resistance rusults. When the content of the aqueous dispersion-type resin exceeds 10 wt. %, on the other hand, the viscosity of the resulting recording liquid increases and stable discharge is hindered.

For pigment, one can use various pigments used for printing ink, paint, etc. The Color Index (C.I.) numbers of such pigments are as follows: C.I. Pigment Yellow 20, 24, 86, 93, 109, 110, 117, 125, 137, 138, 147, 148, 153, 154, 166 and 168; C.I. Pigment Orange 36, 43, 51, 55, 59 and 61; C.I. Pigment Red 9, 97, 122, 123, 149, 168, 177, 180, 192, 215, 216, 217, 220, 223, 224, 226, 227, 228 and 240; C.I. Pigment Violet 19, 23, 29, 30, 37, 40 and 50; C.I. Pigment Blue 15, 15:1, 15:4, 15:6, 22, 60 and 64; C.I. Pigment Green 7 and 36; C.I. Pigment Brown 23, 25 and 26; C.I. Pigment Black 7 and titanium black.

The pigments listed above may be used in the form of an aqueous slurry after the formation of the pigment or may be used in the powdered form obtained by drying the slurry, by spray drying or by allied methods. It is also possible to use surface-treated pigments having a functionalized surface.

The smaller the size of the pigment particles, the better the splash property of the recording liquid. It is thus preferable to use pigment particles having a smaller particle size or to use a pigment which can be finely divided during the dispersion step. The pigment particles have preferably an average particle size not larger than 0.2 μm, preferably not larger than 0.1 μm as measured by centrifugal sedimentation. The use of a pigment of such small particle size facilitates filtering operation during the preparation of the recording liquid and reduces the precipitation as it ages.

For the ink jet recording liquid of the present invention, a dye can be used in combination to adjust the hue or impart the recording density, as long as it is not used in excess resulting in poor water resistance or light resistance. The use of the dye sometimes deteriorates the dispersion stability of the pigment. Accordingly, it is necessary to limit the proportion of the dye to no more than 40 wt. %, preferably no more than 25 wt. % of the pigment.

Examples of the dye usable in the present invention include acid dyes, basic dyes, direct dyes, reactive dyes, disperse dyes and metal-containing dyes. Preferred are purified dyes from which inorganic salts has been removed.

Exemples of dyes include C.I. Direct Black 17, 19, 32, 51, 71, 108, 146, 154 and 166; C.I. Acid Black 2, 7, 24, 26, 31, 52, 63, 112 and 118; C.I. Food Black 2; C.I. Basic Black 2; C.I. Direct Blue 6, 22, 25, 71, 90 and 106; C.I. Acid Blue 9, 22, 40, 59, 93, 102, 104, 113, 117, 120, 167, 229 and 234; C.I. Basic Blue 1, 3, 5, 7, 9, 24, 25, 26, 28 and 29; C.I. Direct Red 1, 4, 17, 28 and 83; C.I. Acid Red 1, 6, 32, 37, 51, 52, 80, 85, 87, 92, 94, 115, 180, 256, 315 and 317; C.I. Basic Red 1, 2, 9, 12, 13, 14 and 37; C.I. Direct Yellow 12, 24, 26 and 98; C.I. Acid Yellow 11, 17, 23, 25, 29, 42, 61 and 71; C.I. Basic Yellow 11 and 28; C.I. Direct Orange 34, 39, 44, 46 and 60; C.I. Direct Violet 47 and 48; C.I. Direct Brown 109; C.I. Direct Green 59; C.I. Acid Orange 7 and 19; C.I. Acid Violet 49; C.I. Basic Violet 7, 14 and 27.

The aqueous medium consists of water and an aqueous solvent which has been added as needed.

As water, deionized water from which metal ions have been removed or distilled water can be used in an amount within a range of 49 wt. % to 95 wt. % of the recording liquid.

The aqueous solvent can be used to prevent the drying of the recording liquid at the nozzle, to prevent the solidification of the recording liquid, to permit the stable injection of the recording liquid and to prevent the drying of the nozzle with the passage of time. The aqueous solvent is used in an amount ranging from 1 to 50 wt. %, preferably 2 to 25 wt. % of the recording liquid.

Examples of aqueous solvents include ethylene glycol, diethylene glycol, propylene glycol, 1,3-propanediol, triethylene glycol, polyethylene glycol, glycerin, tetraethylene glycol, dipropylene glycol, ketone alcohol, diethylene glycol monobutyl ether, ethylene glycol monobutyl ether, ethylene glycol monoethyl ether, 1,2-hexane diol, N-methyl-2-pyrrolidone, substituted pyrrolidone, 2,4,6-hexanetriol, tetrafurfuryl alcohol and 4-methoxy-4-methylpentanone.

For aqueous solvent, a combined use of glycerin and 1,3-propanediol is particularly preferred. The use of glycerin as the aqueous solvent makes it possible to impart the recording liquid with sufficient water retention, but glycerin used alone tends to cause increase in viscosity. Addition of 1,3-propanediol in combination loweres the viscosity of the recording liquid and suppresses viscosity increase of the recording liquid after evaporation of water. Accordingly, when glycerin is used in combination with 1,3-propanediol, the recording liquid is prevented from viscosity increase in the nozzle, and from solidification as it dries and, as a result, clogging of the nozzle is avoided.

It is also possible to use alcohols such as methanol, ethanol or isopropyl alcohol to increase the drying rate of the recording liquid on the recording paper.

Various additives as described below can be added as needed to the ink jet recording liquid of the present invention:

If a recording sheet is water-permeable, as is the case with paper, it is possible to add a penetrant to accelerate the penetration of the recording liquid into paper, thereby improving apparent drying rate.

Examples of the penetrant include glycol ethers such as diethylene glycol and monobutyl ether which have been listed above as the aqueous solvent, and alkylene glycol, polyethylene glycol monolauryl ether, sodium laurylsulfate, sodium dodecylbenzenesulfonate, sodium oleate and sodium dioctylsulfosuccinate. The penetrants are used in an amount ranging from 0 wt. % to 5 wt. %, preferably 1 wt. % to 5 wt. % of the recording liquid. The penetrant brings about desired effect when used in an amount within the above range. When one uses amounts larger than the above range, undesirable bleeding of printed images and print-through result.

A mildewproofing agent serves to prevent the growth of mildew in the recording liquid. Examples of the mildewproofing agent include sodium dehydroacetate, sodium benzoate and sodium pyridinethion-1-oxide, zincpyridinethion-1-oxide, and amine salts of 1,2-benzisothiazolin-3-one or 1-benzisothiazolin-3-one. The mildewproofing agent is used in an amount ranging from 0.05 wt. % to 1.0 wt. % of the recording liquid.

The chelating agent serves to block metal ions in the recording liquid and prevent the precipitation of metals in the nozzle and of insoluble matters in the recording liquid. Examples of the chelating agent include ethylene diamine tetraacetic acid, sodium salt of ethylenediamine tetraacetic acid, diammonium salt of ethylene diamine tetraacetic acid and tetraammonium salt of ethylene diamine tetraacetic acid. The chelating agent is used in an amount ranging from 0.005 wt. % to 0.5 wt. % of the recording liquid.

In addition, a pH regulator such as amine, inorganic salts, and ammonia or a buffer such as phosphoric acid can be added to regulate the pH of the recording liquid, obtain its dispersion stability and protect the tubing of the liquid passage of the ink jet printer.

Moreover, in order to prevent foam generation during circulation and transfer of the recording liquid or during the preparing of the recording liquid, anti-foaming agent can be added.

Furthermore, anionic, nonionic, cationic or amphoteric surfactant can be used to improve pigment dispersion.

Examples of anionic surfactants include fatty acid salts, alkylsulfate ester salts, alkylarylsulfonate salts, alkylnaphthalenesulfonate salts, dialkylsulfonate salts, dialkylsulfosuccinate salts, alkyldiaryl ether disulfonate salts, alkylphosphate salts, polyoxyethylene alkylether sulfate salts, polyoxyethylene alkylaryl ether sulfate salts, naphthalenesulfonic acid formalin condensate, polyoxyethylene alkylphosphate ester salts, glycerol borate fatty acid esters and polyoxyethylene glycerol fatty acid esters.

Examples of nonionic surfactant include polyoxyethylene alkyl ethers, polyoxyethylene alkylaryl ethers, polyoxyethylene oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters and polyoxyethylene alkylamines as well as fluorine group and silicon group nonionic surfactants.

Examples of cationic surfactant include alkylamine salts, quaternary ammonium salts, alkyl pyridinium salts and alkyl imidazolium salts.

Examples of amphoteric surfactant include alkylbetaine, alkylamine oxide and phosphatidyl choline.

As another additive, urea, dimethyl urea or the like can also be added.

The ink jet recording liquid of the present invention can be prepared by mixing an aqueous dispersion of a pigment, the aqueous dispersion-type resin described above and, as needed, water and additives, and then dispersing each component in the resulting mixture by a sand mill, homogenizer, ball mill, paint shaker or ultrasonic dispersing machine. Alternatively, the liquid can be prepared by first thoroughly kneading a pigment, a dispersant and an additive in a kneader or a twin-roll mill in advance, dispersing each component in the sand mill or the like, diluting with water as needed, and then mixing the diluted dispersion with the aqueous dispersion-type resin and other additives.

Mixing and stirring can be accomplished by a high-speed dispersion mixer or emulsifier as well as a conventional stirrer equipped with a blade or blades.

It is preferred that the recording liquid is filtered thoroughly prior to or after dilution through a filter having a pore size of 0.65 μm or less, preferably through a filter having a pore size of 0.45 μm or less. Prior to the filtration process through a filter, filtration by centrifugal separator can be added to reduce filter clogging to cut down the frequency of filter exchange. Viscosity of the prepared recording liquid should be adjusted to fall in the range of 0.8 cps to 15 cps (25° C.), depending on the design of the ink jet printer. The surface tension should be 25 to 60 dyne/cm. No particular limitation is imposed on the pH but the pH within a range of 4 to 12 is preferred, and weak alkaline range of 7 to 9 pH is particularly preferred.

EXAMPLES

The present invention will hereinafter be described more specifically based on examples. It should, however, be borne in mind that the scope of the present invention is not limited to or by these specific examples, in which all designations of parts and % indicate parts by weight and weight percentage (wt. %),respectively.

Emulsion Preparation 1

A 1-liter four-neck flask was equipped with a blade stirrer and a reflux condenser. The flask is charged with 80 parts of methyl methacrylate, 20 parts of acrylic acid, 1 part of azobisisobutylonitrile and 60 parts of isopropanol. The resulting mixture was heated to 80° C. while being stirred in flowing nitrogen gas and polymerization reaction was maintained for 10 hours. The resin solution thus obtained was dried under reduced pressure, whereby a resin-type emulsifying agent having a Tg of about 105° C., a number average molecular weight of about 10000 and an acid value of about 110 mgKOH/g was obtained in a solid form. After a 1-liter four-neck flask was equipped with a blade stirrer and a reflux condenser, the flusk was charged with 100 parts of the resulting solid resin-type emulsifying agent, 47 parts of 17% aqueous ammonia and 753 parts of purified water. The resulting mixture was stirred and dissolved at room temperature, whereby an aqueous solution of the resin-type emulsifying agent was obtained. To the resulting aqueous solution of the resin-type emulsifying agent, 30 parts of methyl methacrylate, 70 parts of ethyl acrylate, 0.5 part of ammonium persulfate and 0.5 part of Rongalit were added. The resulting mixture was heated to 60° C. in a nitrogen gas atmosphere, followed by polymerization reaction at 60° C. for 5 hours. What was obtained as a result was an emulsion of an aqueous dispersion-type resin in which the core-forming polymer had a TG of 6° C. and an average particle size of the resin was 80 nm. Its ratio of the resin-type emulsifying agent (shell) to the core material was 50:50 by weight. The emulsion had a solid resin content of 20%.

Emulsion Preparations 2–3

Emulsion Preparations C1–C3

Emulsion Preparations 2–3 and Emulsion Preparations C1–C3 (C for comparison) were prepared from the raw materials shown in Table 1 for the shell and core. These emulsions of an aqueous dispersion-type resins were obtained by the same procedures used for Emulsion Preparation 1.

Incidentally, in Table 1, "MMA", "AA", "A", "St", "MAA", "EHA", "BMA" and "BA" represent methyl methacrylate, acrylic acid, ethyl acrylate, styrene, methacrylic acid, 2-ethylhexyl acrylate, butyl methacrylate and butyl acrylate, respectively.

Emulsion Preparation C4

The emulsion of an aqueous dispersion-type resin was prepared by using a surfactant as follows:

A 1-liter four-neck flask was equipped with a blade stirrer and a reflux condenser. The flask was charged with 5 parts of an anionic surfactant ("EMAL O" produced by Kao Corporation), 3 parts of a nonionic surfactant ("EMULGEN 950" produced by Kao Corporation), 491 parts of purified water, 30 parts of methyl methacrylate, 70 parts of ethyl acrylate, 0.5 part of ammonium persulfate and 0.5 part of Rongalit. The resulting mixture was heated to 60° C. in flowing nitrogen gas and polymerization reaction was maintained at 60° C. for 5 hours. As a result, an emulsion of an aqueous dispersion-type resin with a TG of 6° C. and an average particle size of 100 nm was obtained. Its solid resin content was 20%.

Example 1

20 parts of C.I. Pigment Black 7 ("MONARCH 800"; carbon black produced by CABOT Corporation), 5 parts of an anionic surfactant ("EMAL 10" produced by Kao Corporation), 5 parts of a nonionic surfactant ("EMULGEN 920" produced by Kao Corporation) and 70 parts of purified water were mixed. This mixture was then subjected to dispersion in a sand mill for 2 hours after which a water dispersion of black pigment particles with an average particle size of about 100 nm was obtained. 20 parts of the resulting water dispersion of the black pigment (pigment content: 4%), 15 parts of the emulsion of an aqueous dispersion-type resin (solid content: 20%) of Emulsion Preparation 1, 10 parts of glycerin, 0.1 part of a mildew-proofing agent ("Sodium Omadine" produced by OLIN CHEMICALS) and 54.9 parts of purified water were stirred and mixed in a disper. The resulting mixture was then filtered through a membrane filter made of nitro cellulose with a pore size of 0.45 $\mu$m. The filtrate thus obtained was the black ink jet recording liquid.

Examples 2–4, Examples C1–C4

In these instances, each ink jet recording liquid was obtained by the same procedure as in Example 1 using the emulsion of the aqueous dispersion-type resins (solid content: 20%) prepared as Preparations 1–3 or Preparations C1–C4. Components used for the preparation of those ink jet recording liquids are shown in Table 2.

Example C5

C5 was prepared to show comparison between the ink jet recording liquid prepared using the pigment of the present invention and a prior art ink jet recording liquid prepared using a dye. Ink jet recording liquid C5 was thus prepared using Food Black 2 as a dye instead of a pigment and the emulsion of the aqueous dispersion-type resin (solid content: 20%) of Emulsion Preparation 1.

Particle size and viscosity measurements were made and storage stability, discharge stability, water resistance and clogging resistance were evaluated on each of the ink jet recording liquids 1–4 and C1–C5. Results are shown in Table 2. The measurements and evaluations were conducted as described in the following:

(1) Particle size

The particle size distribution of the recording liquid was measured by a particle-size-distribution gauge using a laser diffraction method ("DSL-700", manufactured by Ohtsuka Denshi Co., Ltd.). Average particle size was then calculated.

(2) Viscosity

The viscosity at 25° C. was measured by a vibration viscometer ("VM-1A" manufactured by Yamaichi Denkisha Co, Ltd.).

(3) Storage stability

The recording liquid was stored at 50° C. for three months. Storage stability was evaluated based on the change in the particle size after aging. In Table 2, "○" indicates that the change in the particle size was less than 15 nm, while "X" indicates that the change in the particle size was 15 nm or greater.

(4) Discharge stability

The recording liquid was loaded in the cartridge of an ink jet printer ("HG-5130", manufactured by Seiko Epson Co., Ltd.). Discharge stability was evaluated by printing on paper ("K", produced by Xerox Corporation). In Table 2, "○" indicates that the recording liquid was discharged stably from the nozzle, while "X" indicates that the recording liquid was not discharged stably from the nozzle.

(5) Water resistance

The printed matter obtained in (4) was moistened with water and then the printed surface was rubbed by a finger. Changes, if any, in the printed portion was visually inspected. In Table 2, "○" indicates that neither bleeding nor peeling of the ink was detected, and "X" indicates that bleeding or peeling of the ink was observed.

(6) Clogging resistance

After the printing in (4), the cap was removed from the printer head. Printing was resumed one hour later and presence or absence of clogging was noted. In Table 2, "○" indicates that the nozzle was not clogged, and "X" indicates that the nozzle was clogged.

In Table 2, surfactant A, surfactant B, surfactant C and surfactant D represent an anionic surfactant ("EMAL 10" produced by Kao Corporation), a nonionic surfactant ("EMULGEN 920" produced by Kao Corporation), an anionic surfactant ("Newcol 565SNC" produced by Nippon Nyukazai Co., Ltd.) and a nonionic surfactant ("Solsperse 27000", produced by Degussa AG), respectively.

2. An ink jet recording liquid of claim 1, wherein the polymer forming the shell has a glass transition point in the range of 60° C. to 120° C. and the polymer forming the core has a glass transition point in the range of −50° C. to 20° C.

3. An ink jet recording liquid of claim 1, wherein the resin has an average particle size in the range of 20 nm to 200 nm.

4. An ink jet recording liquid of claim 1, wherein the resin contains resin particles having a particle size of at least 1000 nm in an amount equal to or less than 10 wt. % of the aqueous dispersion-type resin.

5. An ink jet recording liquid of claim 1, wherein the resin is contained in an amount in the range of 0.5 to 5 wt. % of the recording liquid.

TABLE 1

| | | Emulsion Preparation | | | Emulsion Preparation C | | |
|---|---|---|---|---|---|---|---|
| | | 1 | 2 | 3 | C1 | C2 | C3 |
| Resin-type emulsifying agent | Composition (part) | MMA (80) AA (20) | St (70) MAA (30) | BMA (50) MAA (50) | BMA (80) AA (20) | MMA (80) AA (20) | BMA (80) AA (20) |
| | Number average molecular weight | 10,000 | 6,000 | 10,000 | 10,000 | 10,000 | 10,000 |
| | Tg | 105° C. | 109° C. | 66° C. | 34° C. | 105° C. | 34° C. |
| | Acid value (mgKOH/g) | 110 | 140 | 230 | 110 | 110 | 110 |
| Core | Composition (part) | MMA (30) EA (70) | St (70) EHA (30) | BA (100) | MMA (30) EA (70) | St (80) EA (20) | St (80) EA (20) |
| | Tg | 6° C. | 15° C. | −53° C. | 6° C. | 67° C. | 67° C. |
| Weight ratio of shell to core | | 50/50 | 30/70 | 50/50 | 50/50 | 40/60 | 50/50 |
| Average particle size of resin | | 80 nm | 90 nm | 80 nm | 80 nm | 80 nm | 90 nm |

TABLE 2

| | | Examples | | | | C Examples | | | | |
|---|---|---|---|---|---|---|---|---|---|---|
| | | 1 | 2 | 3 | 4 | C1 | C2 | C3 | C4 | C5 |
| Dispersion of pigment | Pigment (C.I.) (part) | Black 7 (20) | Red 122 (20) | Yellow 74 (20) | Red 122 (20) | Black 7 (20) | Black 7 (20) | Red 122 (20) | Black 7 (20) | — |
| | Surfactant (part) | A (5) B (5) | C (5) D (3) | A (5) B (3) | C (5) D (3) | A (5) B (5) | A (5) B (5) | C (5) D (3) | A (5) B (5) | — |
| | Purified water | 70 parts | 72 parts | 72 parts | 72 parts | 70 parts | 70 parts | 72 parts | 70 parts | — |
| | Average particle size | 80 nm | 100 nm | 80 nm | 100 nm | 80 nm | 80 nm | 100 nm | 80 nm | — |
| Recording liquid | Pigment dispersion | 20 parts | 10 parts | 20 parts | 10 parts | 20 parts | 20 parts | 10 parts | 20 parts | — |
| | Dye (part) | — | — | — | — | — | — | — | — | Food black 2 (3.5) |
| | Emulsion of a resin (part) | Prep. 1 (15) | Prep. 2 (15) | Prep. 3 (20) | Prep. 2 (15) | Prep. C1 (15) | Prep. C2 (15) | Prep. C3 (15) | Prep. C4 (15) | Prep. 1 (15) |
| | Glycerin | 10 parts | 10 parts | 10 parts | 5 parts | 10 parts | 10 parts | 10 parts | 10 parts | 10 parts |
| | 1,3-propanediol | — | — | — | 10 parts | — | — | — | — | — |
| | Mildewproofing agent | 0.1 parts | 0.1 parts | 0.1 parts | 0.1 parts | 0.1 parts | 0.1 parts | 0.1 parts | 0.1 parts | 0.1 parts |
| | Purified water | 54.9 parts | 64.9 parts | 49.9 parts | 59.9 parts | 54.9 parts | 54.9 parts | 64.9 parts | 54.9 parts | 71.4 parts |
| Evaluation results | Average particle size | 90 nm | 90 nm | 90 nm | 90 nm | 90 nm | 90 nm | 90 nm | 100 nm | 80 nm |
| | Viscosity | 1.7 cps | 1.5 cps | 1.8 cps | 1.7 cps | 1.7 cps | 1.7 cps | 1.5 cps | 1.5 cps | 1.3 cps |
| | Storage stability | ○ | ○ | ○ | ○ | ○ | ○ | ○ | X | ○ |
| | Discharge stability | ○ | ○ | ○ | ○ | ○ | ○ | ○ | X | ○ |
| | Water resistance | ○ | ○ | ○ | ○ | X | X | X | ○ | X |
| | Clogging resistance | ○ | ○ | ○ | ○ | ○ | ○ | ○ | X | ○ |

Prep.: Emulsion Preparation,
Prep. C: Emulsion Preparation, Series C.

What is claimed is:

1. An ink jet recording liquid obtained by dispersing a pigment and a resin in an aqueous medium, said resin comprising a shell composed of a polymer having a glass transition point in the range of 50° C. to 150° C. and a core composed of a polymer having a glass transition point in the range of −100° C. to 40° C., wherein said resin is contained in an amount in the range of 0.1 to 10 wt. % of the recording liquid.

6. An ink jet recording liquid of claim 1, wherein the weight ratio of the shell to the core falls within the range of 10:90 to 70:30.

7. An ink jet recording liquid of claim 1, wherein the polymer forming the shell contains a carboxyl group and has an acid value of 50 to 250 mgKOH/g.

8. An ink jet recording liquid of claim 1, wherein the aqueous medium contains glycerin and 1,3-propane diol.

9. The ink jet recording liquid of claim 1, wherein the polymer forming the core is a polymer of one or more polymerizable monomers having an ethylenic unsaturated double bond.

10. The ink jet recording liquid of claim 9, wherein the one or more polymerizable monomers are selected from the group consisting of alkyl acrylate, alkyl methacrylate, styrene and mixtures thereof.

* * * * *

UNITED STATES PATENT AND TRADEMARK OFFICE

CERTIFICATE OF CORRECTION

PATENT NO. : 5,814,685

DATED : September 29, 1998

INVENTOR(S) : Sunao Satake, et al.

It is certified that error appears in the above-identified patent and that said Letters Patent is hereby corrected as shown below:

Column 12, Line 10, delete "aqueous dispersion-type".

Signed and Sealed this

Third Day of August, 1999

Attest:

Q. TODD DICKINSON

Attesting Officer

*Acting Commissioner of Patents and Trademarks*